(12) United States Patent
Sist et al.

(10) Patent No.: US 12,377,401 B2
(45) Date of Patent: Aug. 5, 2025

(54) SCR CATALYST COMPOSITIONS AND SCR CATALYTIC ARTICLES COMPRISING SAID CATALYST COMPOSITIONS

(71) Applicant: Umicore AG & Co. KG, Hanau-Wolfgang (DE)

(72) Inventors: Mattia Sist, Lyngby (DK); Elsa Brix Roedern, Lyngby (DK); Elodie Quinet, Hanau (DE); Peter Havgaard Steffensen, Roskilde (DK); Jennifer Marion Gabrielsson, Charlottenlund (DK)

(73) Assignee: Umicore AG & Co. KG, Hanau-Wolfgang (DE)

( * ) Notice: Subject to any disclaimer, the term of this patent is extended or adjusted under 35 U.S.C. 154(b) by 159 days.

(21) Appl. No.: 18/043,801

(22) PCT Filed: Sep. 16, 2021

(86) PCT No.: PCT/EP2021/075424
§ 371 (c)(1),
(2) Date: Mar. 2, 2023

(87) PCT Pub. No.: WO2022/058404
PCT Pub. Date: Mar. 24, 2022

(65) Prior Publication Data
US 2024/0009652 A1    Jan. 11, 2024

(30) Foreign Application Priority Data
Sep. 18, 2020  (EP) ..................... 20197042

(51) Int. Cl.
*B01J 23/00* (2006.01)
*B01D 53/94* (2006.01)
(Continued)

(52) U.S. Cl.
CPC ........ *B01J 23/002* (2013.01); *B01D 53/9418* (2013.01); *B01J 23/30* (2013.01);
(Continued)

(58) Field of Classification Search
CPC . B01J 23/002; B01J 23/30; B01J 35/56; B01J 37/0242; B01J 2523/47;
(Continued)

(56) References Cited

U.S. PATENT DOCUMENTS

2005/0042151 A1* 2/2005 Alward ............... B01D 53/944
422/177
2011/0209459 A1* 9/2011 Hancu ................. F01N 3/0821
60/274
(Continued)

FOREIGN PATENT DOCUMENTS

CN    106861674    6/2017
CN    107262086    10/2017
(Continued)

OTHER PUBLICATIONS

International Search Report received in PCT/EP2021/075424 mailed Dec. 10, 2021.
(Continued)

*Primary Examiner* — Mark A Laurenzi
*Assistant Examiner* — Kelsey L Stanek
(74) *Attorney, Agent, or Firm* — Suzannah K. Sundby, Esq.; Canady + Lortz LLP

(57) ABSTRACT

The present invention disclose catalyst compositions for the selective catalytic reduction of nitrogen oxides, consisting of at least one oxide of vanadium in an amount of 2.0 to 4.0 wt.-%, calculated as $V_2O_5$ and based on the total weight of the catalyst composition, at least one oxide of tungsten in an amount of 2.5 to 7.2 wt.-%, calculated as $WO_3$ and based on the total weight of the catalyst composition, at least one
(Continued)

oxide of antimony in an amount of 0.6 to 3.4 wt.-%, calculated as $Sb_2O_5$ and based on the total weight of the catalyst composition, at least one oxide of zirconium in an amount of 0 to 1.0 wt.-%, calculated as $ZrO_2$ and based on the total weight of the catalyst, and at least one oxide of titanium in an amount of 84.6 to 94.9 wt.-% calculated as $TiO_2$ and based on the total weight of the catalyst, wherein the weight ratio of the oxides of vanadium, tungsten, antimony, titanium and optionally zirconium, calculated as $V_2O_5$, $WO_3$, $Sb_2O_5$, $TiO_2$ and optionally $ZrC_2$, respectively, add up to 100 wt.-%. Furthermore, SCR catalytic articles are disclosed wherein an SCR catalyst composition according to the invention is affixed in the form of a coating. Suitable catalyst carriers are corrugated substrates and cordierite monoliths. The SCR catalytic articles can be used in a method for the reduction of nitrogen oxides in exhaust gases of lean-burn internal combustion engines, and they can furthermore be comprised in an exhaust gas purification system for the treatment of diesel exhaust gas.

8 Claims, 4 Drawing Sheets

(51) Int. Cl.

| | | |
|---|---|---|
| *B01J 23/30* | (2006.01) | |
| *B01J 35/56* | (2024.01) | |
| *B01J 37/02* | (2006.01) | |
| *F01N 3/035* | (2006.01) | |
| *F01N 3/10* | (2006.01) | |
| *F01N 3/20* | (2006.01) | |
| *F01N 3/28* | (2006.01) | |

(52) U.S. Cl.
CPC ........... *B01J 35/56* (2024.01); *B01J 37/0242* (2013.01); *F01N 3/035* (2013.01); *F01N 3/106* (2013.01); *F01N 3/2066* (2013.01); *F01N 3/2803* (2013.01); *B01D 2251/2062* (2013.01); *B01D 2255/20707* (2013.01); *B01D 2255/20715* (2013.01); *B01D 2255/20723* (2013.01); *B01D 2255/20776* (2013.01); *B01D 2255/2098* (2013.01); *B01D 2255/40* (2013.01); *B01D 2255/9155* (2013.01); *B01D 2257/404* (2013.01); *B01D 2258/012* (2013.01); *B01J 2523/47* (2013.01); *B01J 2523/48* (2013.01); *B01J 2523/53* (2013.01); *B01J 2523/55* (2013.01); *B01J 2523/69* (2013.01); *F01N 2370/02* (2013.01)

(58) Field of Classification Search
CPC ................. B01J 2523/48; B01J 2523/53; B01J 2523/55; B01J 2523/69; B01D 53/9418; B01D 2251/2062; B01D 2255/20707; B01D 2255/2071; B01D 2255/05; B01D 2255/20723; B01D 2255/20776; B01D 2255/2098; B01D 2255/40; B01D 2255/9155; B01D 2257/404; B01D 2258/012; F01N 3/035; F01N 3/106; F01N 3/2066; F01N 3/803; F01N 2370/02
USPC ...................................................... 423/213.2
See application file for complete search history.

(56) References Cited

U.S. PATENT DOCUMENTS

| | | |
|---|---|---|
| 2013/0205743 A1 | 8/2013 | Sobolevskiy |
| 2016/0288094 A1 | 10/2016 | Malmberg |
| 2019/0046962 A1* | 2/2019 | Sun .......................... B01J 35/56 |
| 2019/0160428 A1 | 5/2019 | Chen |

FOREIGN PATENT DOCUMENTS

| | | | |
|---|---|---|---|
| CN | 107262086 A | * 10/2017 | ......... B01D 53/8628 |
| CN | 108201891 | 6/2018 | |
| EP | 0345695 | 12/1989 | |
| EP | 0385164 | 9/1990 | |
| KR | 101670075 | 10/2016 | |
| KR | 20190112564 | 10/2019 | |
| WO | 8903366 | 4/1989 | |
| WO | 2010066345 | 6/2010 | |
| WO | 2011011101 | 1/2011 | |
| WO | 2011013006 | 2/2011 | |
| WO | 2011127505 | 10/2011 | |
| WO | 2017101449 | 6/2017 | |
| WO | 2018018406 | 2/2018 | |

OTHER PUBLICATIONS

Written Opinion received in PCT/EP2021/075424 mailed Dec. 10, 2021.
Ha et al., SO2 resistant antimony promoted V2O5/TiO2 catalyst for NH3-SCR of NOx at low temperatures, Feb. 1, 2008, pp. 301-308, vol. 78, No. 3-4, Publisher: Applied Catalysis B: Environmental.

* cited by examiner

SCR CATALYST COMPOSITIONS AND SCR CATALYTIC ARTICLES COMPRISING SAID CATALYST COMPOSITIONS

The present invention relates to SCR catalyst compositions consisting of oxides of titanium, vanadium, tungsten, antimony and optionally zirconium. Furthermore, SCR catalytic articles comprising said catalyst compositions are disclosed. The SCR catalyst compositions according to the present invention and the SCR catalytic articles comprising said SCR catalyst compositions can be used for the exhaust purification of lean combustion engines, in particular for diesel engines.

Exhaust gases from motor vehicles with a predominantly lean-operated combustion engine contain, in particular, the primary emissions of carbon monoxide CO, hydrocarbons HC, and nitrogen oxides in addition to particle emissions. Due to the relatively high oxygen content of up to 15 vol-%, carbon monoxide and hydrocarbons may relatively easily be rendered harmless by means of oxidation; however, reducing nitrogen oxides to nitrogen is much more difficult.

A known method for removing nitrogen oxides $NO_x$ from exhaust gases in the presence of oxygen is the selective catalytic reduction (SCR method) by means of ammonia on a suitable catalyst. In this method, the nitrogen oxides to be removed from the exhaust gas are converted to nitrogen and water using ammonia. Nitrogen monoxide NO and nitrogen dioxide $NO_2$ are summarized as $NO_x$.

The selective catalytic reduction (SCR) takes place in the presence of an SCR catalyst according to the reaction schemes below:

$$4NO+4NH_3+O_2 \rightarrow 4N_2+6H_2O \quad (1)$$

$$NO+NO_2+2NH_3 \rightarrow 2N_2+3H_2O \quad (2)$$

$$6NO_2+8NH_3 \rightarrow 7N_2+12H_2O \quad (3)$$

$$2NO_2+4NH_3+O_2 \rightarrow 3N_2+6H_2O \quad (4)$$

Reactions 1 and 2 are the predominant ones with one mole of ammonia consumed per each mole of $NO_x$ converted. Reactions 3 and 4 occur in gases where a large fraction of the $NO_x$ is present as $NO_2$. To allow the reactions to occur at temperatures of 150 to 480° C., a catalyst is used. The most common SCR catalyst types are based on vanadium oxides as the active compounds on a titanium dioxide ($TiO_2$) carrier system, or on molecular sieves promoted with transition metals. In the latter case, it mostly deals with zeolites promoted with copper and/or iron.

Reaction 1 is known as the "standard SCR reaction", reaction 2 is the "fast SCR reaction", and reactions 3 and 4 are the "$NO_2$ SCR reaction".

The ammonia, which is used as a reducing agent, can be produced in the exhaust system as a secondary emission or made available in the exhaust gas system and subsequent hydrolysis by injecting a precursor from which ammonia can be formed, such as urea, ammonium carbamate, or ammonium formate.

To perform the last-mentioned variant of the SCR method, a source for the provision of the reducing agent—an injection device for metering the reducing agent into the exhaust gas as required—and an SCR catalyst arranged in the flow path of the exhaust gas are needed.

Mixed oxides, for example, which are based in particular on titanium dioxide and/or oxides of vanadium such as vanadium pentoxide, and which can contain other oxides, such as those of silicon, molybdenum, manganese, tungsten, and others, can be used as SCR catalysts. These catalysts are described in detail in the literature; see, for example, WO 89/03366 A1, EP 0 345 695 A2, EP 0 385 164 A2, WO 2011/013006 A2, and US 2013/205743 A1.

WO 2011/011101 A1 discloses catalysts for the selective catalytic reduction of nitrogen oxides. The catalysts comprise metal oxide supports, vanadium, an active material, and antimony, a promoter that acts as a catalyst for reduction of nitrogen oxides, and at the same time, can promote higher sulfur poisoning resistance and low temperature catalytic activity. The amount of antimony of the catalysts is preferably 0.5-7 wt.-%, and the amount of vanadium is preferably between 1 and 3 wt.-%. According to WO 2011/011101 A1, mixed metal oxide catalysts comprising tungsten oxides increase the sulfur poisoning resistance at low temperatures, but the use of tungsten oxides significantly increases the price of the catalyst and should this be avoided for economic reasons. As a consequence, the catalysts according to this invention do not comprise tungsten. However, the mixed metal oxide catalysts according to WO 2011/011101 A1 comprise supports, for instance titanium oxides, silicates, zirconia, alumina and mixtures thereof. Preferably, the support (also synonymously called carrier) is $TiO_2$.

WO 2011/127505 A1 discloses a catalyst composition comprising a vanadate represented by the formula $XVO_4/S$, wherein $XVO_4$ stands for a Bi-, Sb-, Ga- and/or Al-vanadate optionally in mixture with one or more rare earth metal-vanadates, or in mixture with one or more transition metal vanadates, or in mixture with one or more transition metal-vanadates and one or more rare earth metal-vanadates, and S is a support comprising $TiO_2$, optionally in combination with a dopant and a process for the preparation of such catalyst compositions. If $XVO_4$ represents $SbVO_4$, it is synthesized by mixing a solution of $SbCl_3$ containing 63.9 wt.-% $Sb_2O_3$ and a solution containing $NH_4VO_3$. The solid obtained after calcination was characterized by XRD. The support material is preferably a commercially available $TiO_2/WO_3/SiO_2$. The amounts of $TiO_2$, $WO_3$ and $SiO_2$ in said support material are not given.

WO 2017/101449 A1 discloses a catalyst composition comprising a support $TiO_2$, a composite oxide containing vanadium and antimony, which has a rutile-type structure different from $VSbO_4$ and $V_{0.92}Sb_{0.92}O_4$ as determined by X-ray diffraction (XRD) analysis with CuKα radiation, and optionally, one or more oxides selected from the group consisting of oxides of silicon, oxides of vanadium and oxides of antimony, for selective catalytic reduction of nitrogen oxides; to a process for preparing the catalyst composition, to the catalyst composition obtained/obtainable by the process and to use of the same for selective catalytic reduction of nitrogen oxides. The support material must comprise $TiO_2$, but additionally, it may also consist of $TiO_2$ and $SiO_2$ and $WO_3$, or of $TiO_2$ and $ZrO_2$.

Vanadium and antimony are present in the form of a composite oxide having a rutile structure.

Vanadium, calculated as elemental V, is present in the catalyst in an amount of 0.5 to 6 wt.-%, and antimony, calculated as elemental Sb, in an amount of 0.8 to 16 wt.-%. $TiO_2$ is preferably present in the form of anatase. The content of titanium, calculated as $TiO_2$, is preferably in the range of 50 to 97.5 wt.-%, and the content of silicon (if present), calculated as elemental Si, is preferably in the range of 0.2 to 9.5 wt.-%. WO 2017/101449 A1 is silent about the amounts of $WO_3$ and $ZrO_2$ (in case they are present). It does expressly mention that either a) $TiO_2$ and $SiO_2$ and $WO_3$, or b) $TiO_2$ and $ZrO_2$ can be the support material, but it does not expressly mention that all four oxides, i.e. $TiO_2$ and $SiO_2$ and $WO_3$ and $ZrO_2$ shall be present in the catalyst composition.

CN 107 262 086 A relates to an SCR (selective catalytic reduction) denitration catalyst, in particular to an SCR (selective catalytic reduction) denitration catalyst for accelerating ammonium hydrogen sulfate decomposition by low-temperature flue gas, a preparation method and an application. The SCR denitration catalyst takes composite oxides formed by titanic oxides and transition metal oxides as carriers, vanadium oxides as active components and tungsten oxides as co-catalysts, the molar ratio of transition metal elements to titanium elements in the catalyst is (0.1-0.5):1, and the transition metal oxides include one or more of $MnO_2$, $Fe_2O_3$, $CeO_2$, $ZrO_2$, $Al_2O_3$, $SnO_2$, $Nb_2O_5$ and $Sb_2O_5$. An appropriate quantity of transition metal oxides are added into the catalyst, the SCR denitration catalyst for accelerating low-temperature decomposition of ammonium hydrogen sulfate is prepared, and the catalyst accelerates the ammonium hydrogen sulfate to decompose at the temperature lower than 350° C. Taken together, the catalyst according to CN 107 262 086 A comprises oxides of titanium, vanadium and tungsten, and it may also comprise transition metal oxides selected from zirconium dioxide and antimony pentoxide. The molar ratio of the one or more transition metal elements, for instance the molar ratio of $ZrO_2$ and $Sb_2O_5$, to $TiO_2$ is between 0.1-0.5 to 1.

WO 2018/018406 A1 discloses a catalyst for NOx removal, more specifically, a supported catalyst, a monolithic selective catalytic reduction (SCR) catalyst, preparation method thereof, and method for NOx removal. The supported catalyst comprises a support and catalytically active components supported on the support, which comprise vanadium, antimony and at least one further component selected from the group of oxides of silicon, aluminum and zirconium, preferably at least one of silica and/or alumina. The support material can be chosen from $TiO_2$, or $TiO_2$ and $SiO_2$, or $TiO_2$ and $WO_3$, or $TiO_2$, $SiO_2$ and $WO_3$. The support is preferably $TiO_2$, present in an amount of to 97.5 wt.-%. The content of V is preferably in the range of 1 to 10 wt.-%, and the amount of Sb in the range of 1 to 20 wt.-%, calculated as $V_2O_5$ and $Sb_2O_5$, respectively. $ZrO_2$ and $SiO_2$ may be present in an amount of 0.5 to 20 wt.-%. None of the examples presented in WO 2018/018406 A1 comprises all six elements Ti, W, V, Sb and Zr. Examples 9 and 10 comprise Ti, Si, W, V and Sb, but not Zr. These examples 9 and 10 are the only examples comprising $WO_3$, and their $WO_3$ content is quite high (9 resp. 10 wt.-%). All other examples disclosed in WO 2018/018406 A1 comprise only some of these five elements. Many examples comprise antimony oxides, but in various amounts. According to the SCR activity comparison performed in WO 2018/018406 A1, low antimony oxide contents of about 2 wt.-% show significantly lower Nox conversion rates than catalysts comprising higher amounts of antimony oxide, namely 7 to about 16 wt.-% of antimony oxide. In WO 2018/018406 A1, antimony oxide is calculated as $Sb_2O_3$.

US 2016/0288094 A1 discloses a catalyst comprising at least two catalytically active layers A and B. Layer A is applied directly to the supporting body, and layer B is applied to layer A and covers it at least partially or over the entire length of layer A. Thus, layer B comes into contact with the exhaust gas before layer A. The support can be a throughput honeycomb body or a wall-flow filter. Both layers A and B comprise a carrier oxide selected from titanium dioxide, zirconium dioxide, or aluminium oxide, preferably titanium dioxide. Layer A comprises vanadium pentoxide and tungsten trioxide as catalytically active metal oxides, and optionally also silicon dioxide and/or antimony pentoxide. Layer B comprises vanadium pentoxide, tungsten trioxide and silicon dioxide and optionally also antimony pentoxide. The total weight of layer A is greater than the total weight of layer B, and the ratio of vanadium pentoxide in layer A is greater than the ratio of vanadium pentoxide in layer B. If layer A comprises silicon dioxide, then its proportion in layer A is smaller than that in layer B. The catalysts in the examples all have high tungsten pentoxide ratios of about 7 to 10 wt.-% in both layers A and B.

In H H Phil, M P Reddy, P A Kumar, L K Ju and J S Hyo: "$SO_2$ resistant antimony promoted $V_2O_5/TiO_2$ catalyst for $NH_3$-SCR of Nox at low temperatures", Applied Catal B 2008, 78, 301-308, the effect of promoters on the sulfur resistance of $V_2O_5/TiO_2$ SCR catalysts was investigated. The promoters were chosen from Se, Sb, Cu, S, B, Bi, Pb and P. Selenium showed the best Nox conversion rates between 150 and 400° C., but selenium has a high vapor pressure and was thus excluded. Among the remaining promoters, a 2 wt.-% Sb loading on $V_2O_5/TiO_2$ showed the best Nox conversion rates in combination with a high resistance to $SO_2$. The catalyst with 2 wt.-% Sb on $V_2O_5/TiO_2$ was compared with a commercially available catalyst comprising 10 wt.-% W on $V_2O_5/TiO_2$. Both catalyst showed comparable NOx conversion rates and $SO_2$ resistance, but the activity measurements performed with both catalysts, i.e. measurements in an atmosphere comprising $SO_2$, $NO_x$, $NH_3$, $O_2$ and $H_2O$, also revealed the formation of significant amounts of ammonium sulfate salts. When tungsten was used as a promoter, it was necessary to increase the percentage of tungsten to an amount of about 5 to 10 wt.-% in order to achieve a low temperature sulfur poisoning resistance. As the amount of tungsten increases the price of the catalyst, it was an aim of this study to find a promoter which can replace tungsten as well as to improve the sulfur poisoning at low temperatures.

Because internal combustion engines in motor vehicles are operated in transient driving cycles, the SCR catalyst must also ensure the highest possible nitrogen oxide conversions with good selectivity, even under widely varying operating conditions. Therefore, a complete and selective conversion of the nitrogen oxide quantities which occur should also be ensured at low temperatures, just as they are at high temperatures, such as arise, for example, at full throttle.

However, previous prior art does not allow vanadium SCR catalysts to be optimized simultaneously with respect to low-temperature activity (T<250° C.) and thermal stability on the one hand and the activity of the fresh and the aged catalyst on the other hand. An improvement in low-temperature activity is always linked to deficits in thermal stability and vice versa, and the same applies, mutatis mutandis, for the activities of fresh versus aged catalysts.

Problem to be Solved by the Invention

However, there is increased market demand for just this type of catalyst compositions. Therefore, the object of the present invention is to provide vanadium-containing catalyst compositions for the selective catalytic reduction of nitrogen oxides which show a good low-temperature activity with simultaneously better thermal stability, and which also show a good catalytic performance both in the fresh and in the aged state. Another object of the present invention is to provide SCR catalytic articles comprising said SCR catalyst compositions.

Solution of the Problem

The object to provide vanadium-containing catalyst compositions for the selective catalytic reduction of nitrogen oxides which are distinguished by good low-temperature activity with simultaneously greater high-temperature selectivity, and which also show a good catalytic performance both in the fresh and in the aged state is accomplished by a catalyst composition consisting of at least one oxide of vanadium in an amount of 2.0 to 4.0 wt.-%, calculated as $V_2O_5$ and based on the total weight of the catalyst composition, at least one oxide of tungsten in an amount of 2.5 to 7.2 wt.-%, calculated as $WO_3$ and based on the total weight of the catalyst composition, at least one oxide of antimony in an amount of 0.6 to 3.4 wt.-%, calculated as $Sb_2O_5$ and based on the total weight of the catalyst composition, at least one oxide of zirconium in an amount of 0 to 1.0 wt.-%, calculated as $ZrO_2$ and based on the total weight of the catalyst, and at least on oxide of titanium in an amount of 84.6 to 94.9% wt.-% calculated as $TiO_2$ and based on the total weight of the catalyst, wherein the weight ratio of the oxides of vanadium, tungsten, antimony, titanium and zirconium, calculated as $V_2O_5$, $WO_3$, $Sb_2O_5$, $TiO_2$ and optionally $ZrO_2$, respectively, add up to 100 wt.-%.

It has surprisingly been found that the novel catalyst compositions show good activity at low and at high temperatures and also a better thermal stability in the fresh and the aged state.

The catalyst compositions for the selective catalytic reduction of nitrogen oxides according to the present invention which show a good low-temperature activity with simultaneously greater high-temperature selectivity, and which also show a good catalytic performance both in the fresh and in the aged state and the SCR catalytic articles comprising said SCR catalyst compositions are explained below, with the invention encompassing all the embodiments indicated below, both individually and in combination with one another.

A "catalyst composition" is a substance or a mixture of substances which is capable to convert one or more components of an exhaust gas or waste gas into one or more other components. A "catalyst composition" is therefore catalytically active. An example of such a catalyst composition is, for instance, an oxidation catalyst composition which is capable of converting volatile organic compounds and carbon monoxide to carbon dioxide or ammonia to nitrogen oxides. Another example of such a catalyst is, for example, a selective reduction catalyst (SCR) composition which is capable of converting nitrogen oxides to nitrogen and water. In the context of the present invention, an SCR catalyst is a catalyst comprising a carrier substrate and an SCR catalyst composition. The SCR catalyst composition according to the present invention comprises at least one catalytically active metal oxide each of vanadium, tungsten, antimony and titanium and optionally of zirconium as defined above.

A "catalyst substrate", also just called a "carrier substrate" is a support to which the catalyst composition is affixed and shapes the final catalyst. The carrier substrate is thus a carrier for the catalytically active composition.

Suspensions and dispersions are heterogeneous mixtures comprising solid particles and a solvent. The solid particles do not dissolve, but get suspended throughout the bulk of the solvent, left floating around freely in the medium. If the solid particles have an average particle diameter of less than or equal to 1 µm, the mixture is called a dispersion; if the average particle diameter is larger than 1 µm, the mixture is called a suspension.

The term "mixture" as used in the context of the present invention is a material made up of two of more different substances which are physically combined and in which each ingredient retains its own chemical properties and makeup. Despite the fact that there are no chemical changes to its constituents, the physical properties of a mixture, such as its melting point, may differ from those of the components.

A "washcoat" is a suspension or dispersion of solid particles which can be applied to a catalyst substrate. This suspension or dispersion is often referred to as the "washcoat slurry". The slurry is applied to the carrier substrate and subsequently dried.

It is also possible to successively affix two or more washcoats to the carrier substrate. The skilled person knows that affixing two or more washcoats onto one single carrier substrate is possible by "layering" or by "zoning", and it is also possible to combine layering and zoning. In case of layering, the washcoats are affixed successively onto the carrier substrate, one after the other. The washcoat that is affixed first and thus in direct contact with the carrier substrate represents the "bottom layer", and the washcoat that is affixed last it the "top layer". In case of zoning, a first washcoat is affixed onto the carrier substrate from a first face side A of the carrier substrate towards the other face side B, but not over the entire length of the carrier substrate, but only to and endpoint which is between face sides A and B. Afterwards, a second washcoat is affixed onto the carrier, starting from face side B until an endpoint between face sides B and A. The endpoints of the first and the second washcoat need not be identical: if they are identical, then both washcoat zones are adjacent to one another. If, however, the endpoints of the two washcoat zones, which are both located between face sides A and B of the carrier substrate, are not identical, there can be a gap between the first and the second washcoat zone, or they can overlap. As mentioned above, layering and zoning can also be combined, if, for instance, one washcoat is applied over the entire length of the carrier substrate, and the other washcoat is only applied from one face side to an endpoint between both face sides.

Washcoats in the sense of the present invention comprise a solvent, usually water, and particles of the at least one oxide of titanium. In addition, the washcoat may optionally comprise binders and/or additives. Suitable binders are, for example, alumina, silica, non-zeolite silica-alumina, and naturally occurring clay. Suitable additives are, for example, polyacrylates, amines, citrates, tartrates and rheological modifiers such as starches and celluloses. The skilled person knows such binders and additives and can use them in the context of the present invention without departing from the scope of the claims.

A washcoat can be applied in one or more steps onto the carrier substrate.

In one embodiment of the present invention, the washcoat slurry comprises a solvent, usually water, and particles of the at least one oxide of titanium. This washcoat is applied onto the substrate and dried. Subsequently, each of the at least one oxide of vanadium, tungsten, antimony and optionally zirconium or precursors thereof are applied onto the dried and calcined washcoat, for example by impregnation of the dried and calcined washcoat with precursors of each of the at least one oxides of vanadium, tungsten, antimony and optionally zirconium. It is possible to either apply each of the at least one oxide of vanadium, tungsten, antimony and zirconium in the form of precursors of said oxides, or to apply all of them in the form of the oxides, or to apply some of the oxides in the form of precursors of the oxides and some in the form of the oxides. A precursor is a chemical compound, for instance a salt, comprising the metal of the intended oxide of vanadium, tungsten, antimony or zirconium, which can be converted into the final oxide, for instance by thermal treatment.

In another embodiment of the present invention, the washcoat slurry comprises a solvent, usually water, the at least one oxide of titanium, and each of the at least one oxide of vanadium, tungsten, antimony and optionally zirconium and/or precursor of the at least one oxide of vanadium, tungsten, antimony and optionally zirconium. In case precursors of the least one oxide of vanadium, tungsten, antimony and optionally zirconium are used, they are subsequently converted into the catalytically active metal oxides as described above.

It is furthermore possible to apply the at least one oxide of titanium and some of the oxides of vanadium, tungsten, antimony and optionally zirconium and/or precursors thereof to the catalyst substrate in the form of a washcoat slurry, whereas the other oxides of vanadium, tungsten, antimony and optionally zirconium are subsequently applied onto the dried and calcined washcoat, for instance by impregnation as described above. In the context of the present invention, a "coating" is an SCR catalyst composition according to the present invention that has been affixed to the catalyst substrate. The fixing of said SCR catalyst composition can be carried out according to the embodiments described above. Thus, the coating comprises the oxides of titanium, vanadium, tungsten, antimony and optionally zirconium as described above.

In embodiments of the present invention wherein the washcoat comprises all metal oxides of the catalyst composition or precursors thereof, the washcoat is dried after application onto the carrier substrate, for example at room temperature. Subsequently, the coated carrier substrate is calcined, for example at temperatures of between 500 and 600° C. This method of applying a washcoat onto a substrate is referred to hereinafter as the "one-pot method". It is feasible with both corrugated and cordierite substrates.

In embodiments of the present invention wherein the washcoat comprises some, but not all of the metal oxides of the catalyst composition or precursors thereof, the washcoat is dried after application onto the carrier substrate, for example at room temperature. Subsequently, the coated carrier substrate is calcined, for example at temperatures of between 500 and 600° C. Afterwards, the other oxides or precursors thereof are applied onto the dried washcoat, for instance by impregnation, followed by a drying step, preferably at room temperature. Then, the coated carrier substrate is heated to a temperature of 450 and 600° C. If precursors of the metal oxides have been used, this heating step decomposes the precursors into the corresponding metal oxides.

These methods for applying, drying and calcining a washcoat and for decomposing a metal oxide precursor in order to convert it to the corresponding metal oxide are well known to the skilled person, and they can be applied in the context of the present invention without departing from the scope of the claims.

Optionally, it is also possible to mix the catalyst support material and each of the at least one oxide of titanium, vanadium, tungsten, antimony and optionally zirconium or precursors thereof and to extrude it. It is also possible to extrude only the catalyst support material and the at least one oxide of titanium and to apply the other oxides or precursors thereof afterwards. Furthermore, it is possible to extrude the catalyst support material, the at least one oxide of titanium and some of the other oxides or precursors thereof and to apply other oxides or precursors thereof afterwards. Such extrusion methods are known to the skilled person and can be applied in the context of the present invention without departing from the scope of the claims.

A "catalytic article" or "brick" comprises of a catalyst substrate and a coating affixed thereto.

In the context of the present invention, the "SCR catalyst loading" is the concentration of the SCR catalyst composition, given in grams of the respective component, per liter of the catalyst substrate.

An "SCR catalytic article" is a catalytic article suitable for the removal of $NO_x$ from exhaust gas or waste gas.

A "system" for the purification of exhaust gas as used in the context of the present invention comprises of two or more catalytic articles in a row, wherein each individual catalytic article is designed to remove specific components of the exhaust gas, for instance volatile organic compounds VOC, hydrocarbons HC and carbon monoxide in case of an oxidation catalyst, or nitrogen oxides in case of an SCR catalyst, or particulate matter in case of a particulate filter, or excess ammonia in case of an ammonia slip catalyst ASC. These catalytic articles are well-known.

"Upstream" and "downstream" are terms relative to the normal flow direction of the exhaust gas in the exhaust pipeline. A "zone or catalytic article 1 which is located upstream of a zone or catalytic article 2" means that the zone or catalytic article 1 is positioned closer to the source of the exhaust gas, i.e. closer to the source of combustion, for instance the motor, than the zone or catalytic article 2. The flow direction is from the source of the exhaust gas, i.e. from the source of combustion, to the exhaust pipe. Accordingly, to this flow direction the exhaust gas enters each zone or catalytic article at its inlet end, and it leaves each zone or catalytic article at its outlet end.

The at least one oxide of titanium is present in an amount of 84.6 to 94.9 wt.-%, depending on the amounts of the oxides of vanadium, tungsten, antimony and optionally zirconium. This means that the oxides of vanadium, tungsten, antimony and optionally zirconium are present in the ranges given above, and the remainder is the oxide of titanium so that the total amount of all oxides adds up to 100 wt.-%. The at least one oxide of titanium is titanium dioxide ($TiO_2$). It is well known that $TiO_2$ exists in several phases, among them anatase, rutile and brookite. Suitable titanium dioxides comprise at least 95 wt.-% of anatase, preferably at least 98 wt.-%, and even more preferably at least 99.5 wt.-%. The remainder for adding up to 100 wt.-% is preferably represented by rutile and/or brookite, more preferably by rutile.

The at least one oxide of vanadium is present in an amount of 2.0 to 4.0 wt.-%, preferably 2.4 to 3.4 wt.-%, more preferably 2.4 to 2.8 wt.-%. In one embodiment, the at least one oxide of vanadium is vanadium pentoxide ($V_2O_5$).

The at least one oxide of tungsten is present in an amount of 2.5 to 7.2 wt.-%, preferably 2.5 to 7.0 wt.-%, even more preferably 3.0 to 5.5 wt.-%, and most preferably 3.5 to 5.0 wt.-%. In one embodiment, the at least one oxide of tungsten is tungsten trioxide ($WO_3$).

The at least one oxide of antimony is present in an amount of 0.6 to 3.4 wt.-%, preferably 1.5 to 2.5 wt.-%. In one embodiment, the at least one oxide of antimony is present in the form of antimony pentoxide $Sb_2O_5$.

The catalyst compositions according to the present invention comprise at least one oxide of zirconium in an amount of 0 to 1.0 wt.-%. This means that either no oxide of zirconium is present, corresponding to an amount of the at least one oxide of zirconium of 0 wt.-%, or at least one oxide of zirconium is present in an amount of larger than 0 wt.-% to 1.0 wt.-%. The term "optionally zirconium" as used in the present invention encompasses embodiments wherein no oxide of zirconium is present, and also embodiments comprising at least one oxide of zirconium in an amount of larger than 0 to 1.0 wt.-%.

In embodiments comprising zirconium, the zirconium is present in an amount of larger than 0 to 1.0 wt.-%, preferably 0.01 to 1.0 wt.-%, more preferably 0.2 to 1.0 wt.-%, even more preferably 0.4 to 0.7 wt.-%. In one embodiment, the at least one oxide of zirconium is zirconium dioxide ($ZrO_2$).

The preferred amounts of the oxides of titanium, tungsten, vanadium and antimony are the same as given above for the catalyst not comprising zirconium, and the same applies for the nature of the preferred oxides of these elements.

The skilled person knows that vanadium, tungsten, antimony and zirconium each form several oxides, wherein the metals have different oxidation states.

Known oxides of vanadium are, for instance, $V_2O_3$, $VO_2$ and $V_2O_5$.

Know oxides of tungsten are, for instance, $WO_2$, $WO_3$.

Known oxides of antimony are, for instance, $Sb_2O_3$, $Sb_2O_4$ and $Sb_2O_5$.

Known oxides of zirconium are, for instance, $ZrO_2$.

The skilled person knows that oxides of these metals in various oxidation states can coexist side by side, and that some of the metals, in particular vanadium, form an extensive family of oxides. However, in the context of the present invention, the amounts of the oxides vanadium, tungsten, antimony and zirconium are calculated in the form of the oxides $V_2O_5$, $WO_3$, $Sb_2O_5$ and $ZrO_2$. The skilled person knows how to determine the amounts of the corresponding metals vanadium, tungsten, antimony and zirconium in a catalyst composition and how to convert them into amounts of $V_2O_5$, $WO_3$, $Sb_2O_5$ and $ZrO_2$.

In one embodiment of the present invention, the catalyst composition for the selective catalytic reduction of nitrogen oxides consists of
- at least one oxide of vanadium in an amount of 2.0 to 4.0 wt.-%, calculated as $V_2O_5$ and based on the total weight of the catalyst composition,
- at least one oxide of tungsten in an amount of 2.5 to 7.2 wt.-%, calculated as $WO_3$ and based on the total weight of the catalyst composition,
- at least one oxide of antimony in an amount of 0.6 to 3.4 wt.-%, calculated as $Sb_2O_5$ and based on the total weight of the catalyst composition,
- and at least on oxide of titanium in an amount of 85.6 to 94.9 wt.-% calculated as $TiO_2$ and based on the total weight of the catalyst,
- wherein the weight ratio of the oxides of vanadium, tungsten, antimony and titanium, calculated as $V_2O_5$, $WO_3$, $Sb_2O_5$ and $TiO_2$, respectively, add up to 100 wt.%.

In another embodiment of the present invention, the catalyst composition for the selective catalytic reduction of nitrogen oxides consists of
- at least one oxide of vanadium in an amount of 2.0 to 4.0 wt.-%, calculated as $V_2O_5$ and based on the total weight of the catalyst composition,
- at least one oxide of tungsten in an amount of 2.5 to 7.2 wt.-%, calculated as $WO_3$ and based on the total weight of the catalyst composition,
- at least one oxide of antimony in an amount of 0.6 to 3.4 wt.-%, calculated as $Sb_2O_5$ and based on the total weight of the catalyst composition,
- at least one oxide of zirconium in an amount of 0.2 to 1.0 wt.-%, calculated as $ZrO_2$ and based on the total weight of the catalyst,
- and at least on oxide of titanium in an amount of 84.6 to 94.7 wt.-%, calculated as $TiO_2$ and based on the total weight of the catalyst,
- wherein the weight ratio of the oxides of vanadium, tungsten, antimony, titanium and zirconium, calculated as $V_2O_5$, $WO_3$, $Sb_2O_5$, $TiO_2$ and $ZrO_2$, respectively, add up to 100 wt.-%.

SCR catalytic articles according to the present invention comprise a catalyst substrate onto which an SCR catalyst composition according to the present invention is affixed in the form of a coating.

The catalyst substrate is selected from corrugated substrates and cordierite monoliths.

Suitable cordierite monoliths may be wall-flow filters or flow-through substrates. The wall-flow filters or flow-through substrates may be present in the form of honeycomb bodies.

In one embodiment, the carrier substrate is a corrugated substrate, which is hereinafter also referred to as a "corrugated substrate monolith". Such corrugated substrate monoliths are well known to the skilled person. They are, for instance, disclosed in WO 2010/066345 A1. The corrugated substrate preferably has a wall density of at least 50 g/l, but not more than 300 g/l, and a porosity of at least 50%. The monolithic substrate is a paper of high silica content glass or a paper of E-glass fibre. Optionally, the paper has a layer of diatomaceous earth and/or a layer of titania. A diatomaceous earth is a naturally occurring, soft, siliceous sedimentary rock that is easily crumbled into a fine white to off-white powder. Siliceous rocks are sedimentary rocks that have silica ($SiO_2$) as the principal constituent.

Catalytic articles wherein the catalyst composition is applied onto a corrugated substrate have the advantage that the catalytic layer, i.e. the layer formed by applying the catalyst composition onto the carrier substrate, does not peel off from the monolithic substrate during start and stop of a combustion engine or a gas turbine. Simultaneously, the catalyst has been shown to possess improved catalytic activity.

The catalytic material is applied on a monolithic substrate, which has the form of plane or corrugated plates. The substrate is made from sheets of E-glass fibres or from sheets of a glass with high silicon content. Optionally, the sheets may comprise a layer of $TiO_2$, a layer of diatomaceous earth, or a layer comprising both $TiO_2$ and a diatomaceous earth.

The high silicon content glass contains 94-95 wt.-% $SiO_2$, 4-5 wt.-% $Al_2O_3$ and some $Na_2O$, these fibres have a density of 2,000-2,200 g/l with a fibre diameter of 8 to 10 μm. An example is the commercially available SILEX staple fibre.

The E-glass contains 52-56 wt.-% $SiO_2$, 12-16 wt.-% $Al_2O_3$, 5-10 wt.-% $B_2O_3$, 0-1.5 wt.% $TiO_2$, 0-5 wt.-% $MgO$, 16-25 wt.-% $CaO$, 0-2 wt.-% $K_2O/Na_2O$ and 0-0.8 wt.-% $Fe_2O_3$.

Preferably, the material of the substrate is chosen so that the density of the substrate is at least 50 g/l, but not higher than 300 g/l of the material, and the porosity of the substrate wall is at least 50% by volume of the material.

The porosity of the monolithic substrate is obtained by the pores, which have a depth between 50 μm and 200 μm and a diameter between 1 μm and 30 μm.

The preferred amounts of the oxides of titanium, vanadium, tungsten, antimony and optionally zirconium are the same as given above for the catalyst compositions comprising or not comprising zirconium, and the same applies for the nature of the preferred oxides of these elements.

The fixing of the SCR catalyst composition onto the catalyst substrate in the form of a coating is carried out by applying a washcoat as defined above onto the catalyst substrate.

The washcoat comprises at least a solvent, preferably water, and particles of at least one oxide of titanium. The at least one oxide of titanium preferably is $TiO_2$, and it comprises at least 95 wt.-% of anatase, preferably at least 98 wt.-%, and even more preferably at least 99.5 wt.-%. The remainder for adding up to 100 wt.-% is preferably represented by rutile and/or brookite, more preferably by rutile.

In one embodiment, the washcoat additionally comprises a binder, for example alumina, silica, non-zeolite silica-alumina or naturally occurring clay.

In another embodiment, the washcoat additionally comprises an additive, for example polyacrylates, amines, citrates, tartrates and rheological modifiers such as starches and celluloses.

In yet another embodiment, the washcoat additionally comprises an additive, but no binder.

In case the coating shall comprise at least one oxide of zirconium, zirconium dioxide or a precursor thereof may be added to the washcoat.

It also possible to add a binder and/or an additive and/or at least one oxide of zirconium or a precursor thereof to the washcoat.

In one embodiment, the washcoat consists of water, titanium dioxide, and optionally a binder and/or an additive and/or at least one oxide of zirconium or a precursor thereof.

In another embodiment, the washcoat consists of water, titanium dioxide, and each of the at least one oxide of vanadium, tungsten, antimony and optionally zirconium and/or precursor of the at least one oxide of vanadium, tungsten, antimony and optionally zirconium, and optionally a binder and/or an additive.

In yet another embodiment, the washcoat consists of water, titanium dioxide, and some of the oxides of vanadium, tungsten, antimony and optionally zirconium and/or precursors thereof, and a binder and/or an additive.

The washcoat is applied onto the catalyst substrate in a direction perpendicular to the face sides A and B of the catalyst substrate. It can be applied top to bottom, preferably by applying the washcoat under pressure in the direction from the top face side to the bottom face side. Alternatively, the washcoat can be applied bottom to top, preferably by soaking it from the bottom face side to the top face side under reduced pressure. Applying washcoats top to bottom and bottom to top is well known to the skilled person, and this knowledge can be applied in the context of the present invention without departing from the scope of the claims.

The dry matter and the pH value of the washcoat can be conveniently adjusted in order to achieve the desired coat load. In embodiments of the present invention, the pH value of the washcoat is adjusted so as to be different from the isoelectric point (IEP) of the particles suspended or dispersed in the washcoat. The isoelectric point is the pH value at which a particle carries no net electrical charge. An adjustment to a pH value which is more acidic than the IEP can be carried out by adding an acid, for instance nitric acid.

An adjustment to a pH value which is more basic than the IEP can be carried out by adding a base, for example ammonia or an amine. The skilled person knows how to adjust the dry matter and the pH value of the washcoat, and he can apply this knowledge without departing from the scope of the claims.

Optionally, the washcoat is milled before it is applied onto the catalyst substrate, for instance in a beadmill, Preferably, the particles contained in the washcoat are milled down to a D90 particle size of ≤2 μm.

The washcoat is subsequently dried and calcined after application onto the catalyst substrate, for example drying at room temperature, followed by calcination at 500-600° C.

If the washcoat did not comprise all of the oxides of vanadium, tungsten, antimony and optionally zirconium, said oxides which have not yet been applied can be applied in a subsequent step, for instance by impregnating the washcoat with these oxides and/or with precursors thereof. Impregnation can be carried out, for example, by dipping the washcoated catalyst substrate into an aqueous solution of the precursors. Precursors of the oxides of vanadium, tungsten, antimony and zirconium are preferably used in the form of aqueous solutions thereof.

Suitable precursor salts of vanadium are ammonium metavanadate and oxalates and tartrates of vanadium.

A suitable precursor salt of tungsten is ammonium metatungstate.

Suitable precursor salts of antimony are antimony sulfate, antimony acetate, antimony tartrate, antimony glycolate and antimony acetylacetonate.

Suitable precursors of zirconium are zirconium(IV) chloride, zirconyl(IV) nitrate, zirconyl(IV) sulfate.

If an antimony precursor other than antimony tartrate is used, it is preferred to add tartaric acid to the aqueous solution of the antimony precursor. Preferably, tartaric acid and the antimony precursor are used in a molar ratio of the tartaric acid to antimony of 2:1 to 8:1.

In one embodiment of the present invention, the catalyst substrate is a corrugated substrate, and the washcoat consists of water, titanium dioxide, and optionally a binder and/or an additive and/or at least one oxide of zirconium or a precursor thereof. If the catalyst composition according to the present invention shall comprise zirconium, it is most preferred to add a zirconium precursor to the washcoat. After the application of the washcoat, the washcoated corrugated substrate is subsequently impregnated with aqueous solutions of precursors of vanadium, tungsten and antimony. The application, drying and calcining of the washcoat and the decomposition of the metal oxide precursors into the corresponding metal oxides is carried out as described above.

In another embodiment of the present invention, the catalyst substrate is a corrugated substrate, and the washcoat comprises titanium dioxide and the oxides of vanadium, tungsten, antimony and/or precursors of vanadium, tungsten and antimony and optionally a binder and/or an additive and/or at least one oxide of zirconium or a precursor thereof. Again, the application, drying and calcining of the washcoat and the decomposition of the metal oxide precursors into the corresponding metal oxides is carried out as described above. This method of applying the washcoat is a "one-pot method" as defined above.

In yet another embodiment of the present invention, the catalyst substrate is a cordierite substrate as described above, and the washcoat comprises titanium dioxide and the oxides of vanadium, tungsten, antimony and optionally a binder and/or an additive and/or at least one oxide of zirconium or a precursor thereof.

If a corrugated substrate shall be coated with a washcoat comprising the catalyst composition according to the present invention is preferably between 250 and 550 g/L, more preferably between 350 and 450 g/l.

If a cordierite substrate shall be coated with a washcoat comprising the catalyst composition according to the present invention is preferably between 100 and 500 g/L, more preferably between 150 and 400 g/l.

The catalytic article according to the invention is particularly well suited for the reduction of nitrogen oxides in exhaust gases of lean-burn internal combustion engines, in particular diesel engines.

The present invention, therefore, also relates to a method for the reduction of nitrogen oxides in exhaust gases of lean-burn internal combustion engines, comprising the following method steps:

adding a reducing agent to the exhaust-gas-containing nitrogen oxides, and passing the resulting mixture from the exhaust-gas-containing nitrogen oxides and reducing agent over a catalytic article according to the invention.

As a reducing agent, ammonia comes especially into consideration, whereby, with particular advantage, not ammonia itself, but an ammonia precursor—in particular, urea—is added to the nitrogen-oxide-containing exhaust gas.

In particular, the catalyst according to the invention is used as a component of an exhaust gas cleaning system which, for example, comprises an oxidation catalyst and a diesel particle filter arranged on the inflow side, in addition to the catalytic article according to the invention. In so doing, the catalytic article according to the invention can also be present as a coating on the diesel particle filter.

The present invention therefore also relates to an exhaust gas purification system for the treatment of diesel exhaust gas, comprising, in the flow direction of the exhaust gas, an oxidation catalyst, a diesel particle filter, and a catalytic article according to the invention, or an oxidation catalyst and a diesel particle filter on which a catalyst composition according to the invention is present as a coating.

Oxidation catalysts suitable for the exhaust gas purification system according to the invention—in particular, platinum, palladium, or platinum and palladium supported on, for example, aluminum oxide—and diesel particle filters are known to the person skilled in the art and are commercially available.

The exhaust gas purification system according to the invention generally comprises a device for metering in the reducing agent arranged upstream of the catalyst according to the invention. The injection device can be chosen at will by the person skilled in the art. Such devices are well known to the skilled person, and they can be applied in the context of the present invention without departing from the scope of the claims. The reducing agent introduced into the exhaust gas stream via the injection device may be, in particular, ammonia as such or in the form of a compound from which ammonia is formed under the ambient conditions. Examples of suitable compounds are aqueous solutions of urea or ammonium formate, as well as solid ammonium carbamate. As a rule, the reducing agent or a precursor thereof is kept in stock in a container that is carried along with and connected to the injection device.

EMBODIMENTS

Figure 1:
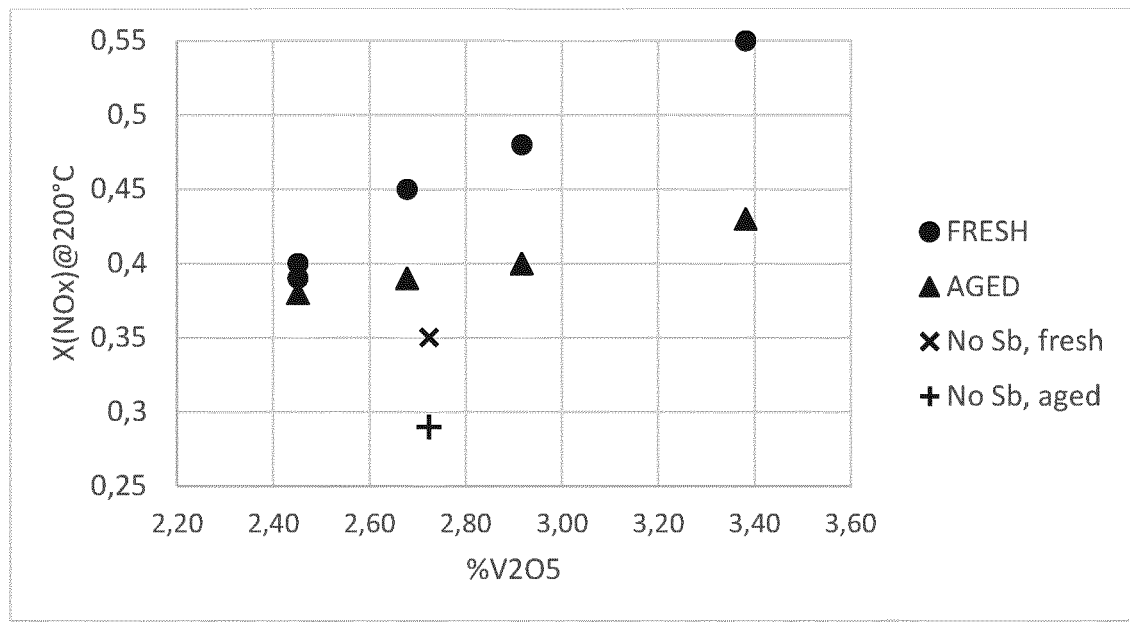
FIG. 1 shows the $NO_x$ conversion at 200° C. in the fresh and the aged state as a function of the amount of $V_2O_5$ in wt.-% in catalyst compositions comprising 3.6 wt.-% $WO_3$ and 1.6 wt.-% $Sb_2O_5$ compared to a catalyst comprising 2.7 wt.-% $V_2O_5$, 4.0 wt.-% $WO_3$ and 0 wt.-% $Sb_2O_5$.

Embodiment 1: Preparation of SCR Catalytic Articles Having Corrugated Catalyst Substrates SCR catalytic articles according to the present invention were prepared. Corrugated substrates were used as the catalyst substrates, and SCR catalyst compositions according to the present invention as well as some comparative catalyst compositions where affixed to them.

Preparation of the Catalytic Articles Having Corrugated Catalyst Substrates

A water-based slurry containing $TiO_2$ (anatase) and $ZrO(NO_3)_2$ having a dry matter content of 57 to 59 wt.-% was applied on a corrugated substrate with a cpsi of 260, wherein "cpsi" stands for "cells per square inch". The substrate was then calcined at 580° C. Subsequently, impregnation solutions were prepared by mixing A grams of a water-based solution containing vanadyl oxalate (7.15% V), B grams of an aqueous solution of ammonium metatungstate (39.36% W), C grams of deionized water, D grams of tartaric acid and E grams of antimony acetate ($Sb(OAc)_3$) in different amounts (see Table 1). The substrate was then dipped into the impregnation solution for 20 seconds, dried and then thermally treated at 450° C. resulting in a catalytic load of % $V_2O_5$, % $WO_3$, % $Sb_2O_5$, % $ZrO_2$ based on the total weight of the catalyst composition, as shown in Table 1.

TABLE 1

Preparation of the catalytic articles having corrugated catalyst substrates and
$V_2O_5$, $WO_3$ and $Sb_2O_5$ contents of the catalytic articles obtained

| Ex. No. | A: g[V stock solution] | B: g[W stock solution] | C: g($H_2O$) | D: g (Tartaric acid) | E: g (Sb (OAc)$_3$) | % $V_2O_5$ [wt.-%] | % $WO_3$ [wt.-%] | % $Sb_2O_5$ [wt.-%] | % $ZrO2$ [wt.-%] | Washcoat loading [g/L] |
|---|---|---|---|---|---|---|---|---|---|---|
| 1  | 160 | 0   | 290 | 60 | 24 | 2.5 | 0.0 | 1.6 | 0.4 | 420 |
| 2  | 156 | 58  | 236 | 60 | 24 | 2.5 | 3.5 | 1.6 | 0.4 | 440 |
| 3  | 152 | 114 | 184 | 60 | 24 | 2.4 | 7.2 | 1.6 | 0.4 | 460 |
| 4  | 218 | 0   | 232 | 60 | 24 | 3.4 | 0.0 | 1.6 | 0.4 | 430 |
| 5  | 213 | 58  | 179 | 60 | 24 | 3.4 | 3.6 | 1.6 | 0.4 | 450 |
| 6  | 207 | 113 | 129 | 60 | 24 | 3.4 | 7.2 | 1.6 | 0.4 | 460 |
| 7  | 161 | 0   | 289 | 0  | 0  | 2.7 | 0.0 | 0.0 | 0.4 | 450 |
| 8  | 157 | 59  | 234 | 0  | 0  | 2.7 | 4.0 | 0.0 | 0.4 | 420 |
| 9  | 153 | 115 | 183 | 0  | 0  | 2.7 | 8.1 | 0.0 | 0.4 | 430 |
| 10 | 155 | 87  | 208 | 60 | 24 | 2.5 | 5.3 | 1.6 | 0.4 | 430 |
| 11 | 186 | 59  | 206 | 60 | 24 | 3.0 | 3.6 | 1.6 | 0.4 | 420 |
| 12 | 155 | 58  | 237 | 60 | 24 | 2.5 | 3.5 | 1.6 | 0.4 | 450 |
| 13 | 154 | 72  | 224 | 60 | 24 | 2.5 | 4.4 | 1.6 | 0.4 | 450 |
| 14 | 169 | 58  | 223 | 60 | 24 | 2.7 | 3.6 | 1.6 | 0.4 | 450 |
| 15 | 157 | 29  | 264 | 60 | 24 | 2.5 | 1.8 | 1.6 | 0.4 | 440 |
| 16 | 156 | 44  | 251 | 60 | 24 | 2.5 | 2.7 | 1.6 | 0.4 | 440 |
| 17 | 153 | 49  | 248 | 60 | 24 | 2.5 | 3.1 | 1.6 | 0.4 | 420 |
| 18 | 167 | 43  | 240 | 60 | 24 | 2.7 | 2.7 | 1.6 | 0.4 | 420 |
| 19 | 168 | 29  | 253 | 60 | 24 | 2.7 | 1.8 | 1.6 | 0.4 | 420 |
| 20 | 167 | 49  | 234 | 60 | 24 | 2.7 | 3.1 | 1.6 | 0.4 | 420 |
| 21 | 182 | 29  | 239 | 60 | 24 | 3.0 | 1.8 | 1.6 | 0.4 | 420 |
| 22 | 181 | 43  | 226 | 60 | 24 | 3.0 | 2.7 | 1.6 | 0.4 | 420 |
| 23 | 181 | 49  | 220 | 60 | 24 | 3.0 | 3.1 | 1.6 | 0.4 | 420 |
| 24 | 175 | 55  | 220 | 60 | 36 | 2.8 | 3.5 | 2.5 | 0.4 | 430 |
| 25 | 175 | 55  | 220 | 60 | 48 | 2.8 | 3.4 | 3.3 | 0.4 | 430 |
| 26 | 152 | 57  | 241 | 60 | 12 | 2.5 | 3.6 | 0.8 | 0.4 | 420 |

It has to be noted that Examples 1, 4, 7, 8 and 9 in Table 1 are comparative Examples, because they either do not comprise tungsten, or antimony, or neither tungsten nor antimony.

Embodiment 2: NOx Conversion and $N_2O$ Formation of the SCR Catalytic Articles Having Corrugated Catalyst Substrates The NOx conversion and $N_2O$ formation of the Examples according to Embodiment 1 were tested in the fresh state and after aging at the following conditions:

NOx (250 ppm), $NH_3$ (300 ppm), $H_2O$ (4%), $O_2$ (12%), GSVH=100,000 $h^{-1}$, $N_2$ to balance. The NOx conversion was measured at 200, 250, 300, 350, 400, 450, 500 and 550° C.

Aging was performed at 100 h at 550° C., $H_2O$=(10%), GSVH=10,000 $h^{-1}$.

All percentages given above refer to volume percent.
GHSV is the gas hourly space velocity.
Based on the inlet and outlet $NO_x$ concentration, the $NO_x$ conversion is calculated as $$X = \frac{(NOx_{in} - NOx_{out})}{NOx_{in}} * 100\% \quad (5)$$

wherein
X: $NO_x$ conversion in percent
$NOx_{in}$: $NO_x$ concentration at the inlet end of the SCR catalytic article
$NOx_{out}$: $NO_x$ concentration at the outlet end of the SCR catalytic article
The $NO_x$ concentrations at the inlet resp. the outlet end can be indicated in mol or as mass. The $NO_x$ and $N_2O$ concentrations were measured by FTIR.

The results of the NOx conversion and the $N_2O$ formation for the fresh and aged examples are shown in Tables 2 and 3.

X(T) indicates the $NO_x$ conversion at a temperature T in ° C. The $N_2O$ formation was measured at 550° C.

TABLE 2

$NO_x$ conversion and $N_2O$ formation at 550° C. of the fresh Examples 1 to 26

| Ex. No. | X (550) | X (500) | X (450) | X (400) | X (350) | X (300) | X (250) | X (200) | N2O (550) |
|---|---|---|---|---|---|---|---|---|---|
| 1  | 0.44 | 0.69 | 0.74 | 0.75 | 0.72 | 0.65 | 0.43 | 0.15 | 0.032 |
| 2  | 0.44 | 0.78 | 0.89 | 0.92 | 0.91 | 0.87 | 0.72 | 0.39 | 0.062 |
| 3  | 0.44 | 0.80 | 0.92 | 0.95 | 0.94 | 0.89 | 0.73 | 0.38 | 0.095 |
| 4  | 0.31 | 0.72 | 0.86 | 0.89 | 0.89 | 0.85 | 0.72 | 0.39 | 0.075 |
| 5  | 0.23 | 0.72 | 0.91 | 0.95 | 0.95 | 0.92 | 0.82 | 0.55 | 0.119 |
| 6  | 0.18 | 0.68 | 0.88 | 0.92 | 0.92 | 0.89 | 0.78 | 0.49 | 0.140 |
| 7  | 0.28 | 0.63 | 0.78 | 0.81 | 0.79 | 0.71 | 0.49 | 0.19 | 0.068 |
| 8  | 0.24 | 0.63 | 0.81 | 0.85 | 0.85 | 0.82 | 0.68 | 0.35 | 0.104 |
| 9  | 0.25 | 0.72 | 0.90 | 0.95 | 0.94 | 0.89 | 0.74 | 0.39 | 0.142 |
| 10 | 0.25 | 0.75 | 0.92 | 0.96 | 0.95 | 0.91 | 0.77 | 0.40 | 0.120 |
| 11 | 0.13 | 0.70 | 0.92 | 0.96 | 0.96 | 0.92 | 0.81 | 0.48 | 0.127 |
| 12 | 0.38 | 0.78 | 0.91 | 0.94 | 0.94 | 0.89 | 0.75 | 0.40 | 0.081 |
| 13 | 0.36 | 0.78 | 0.92 | 0.95 | 0.94 | 0.90 | 0.77 | 0.42 | 0.089 |
| 14 | 0.33 | 0.76 | 0.91 | 0.94 | 0.94 | 0.90 | 0.78 | 0.45 | 0.091 |
| 15 | 0.41 | 0.76 | 0.87 | 0.90 | 0.90 | 0.85 | 0.69 | 0.34 | 0.058 |
| 16 | 0.43 | 0.79 | 0.91 | 0.93 | 0.93 | 0.88 | 0.73 | 0.38 | 0.071 |
| 17 | 0.37 | 0.77 | 0.90 | 0.93 | 0.93 | 0.89 | 0.75 | 0.39 | 0.090 |
| 18 | 0.31 | 0.76 | 0.92 | 0.95 | 0.95 | 0.91 | 0.77 | 0.42 | 0.096 |
| 19 | 0.32 | 0.76 | 0.91 | 0.94 | 0.94 | 0.90 | 0.75 | 0.40 | 0.086 |
| 20 | 0.34 | 0.76 | 0.90 | 0.93 | 0.92 | 0.87 | 0.72 | 0.37 | 0.115 |
| 21 | 0.29 | 0.75 | 0.91 | 0.94 | 0.94 | 0.90 | 0.77 | 0.43 | 0.095 |
| 22 | 0.26 | 0.74 | 0.91 | 0.95 | 0.94 | 0.91 | 0.79 | 0.46 | 0.104 |
| 23 | 0.27 | 0.74 | 0.91 | 0.95 | 0.94 | 0.91 | 0.79 | 0.46 | 0.105 |
| 24 | 0.12 | 0.69 | 0.91 | 0.95 | 0.96 | 0.92 | 0.81 | 0.46 | 0.109 |
| 25 | 0.14 | 0.70 | 0.90 | 0.94 | 0.95 | 0.91 | 0.78 | 0.43 | 0.095 |
| 26 | 0.42 | 0.80 | 0.92 | 0.95 | 0.94 | 0.90 | 0.75 | 0.40 | 0.10 |

TABLE 3

NO$_x$ conversion and N$_2$O formation at 550° C. of the aged Examples 1 to 26

| Ex. No | X (550) aged | X (500) aged | X (450) aged | X (400) aged | X (350) aged | X (300) aged | X (250) aged | X (200) aged | N2O (550) aged |
|---|---|---|---|---|---|---|---|---|---|
| 1 | 0.41 | 0.74 | 0.83 | 0.85 | 0.85 | 0.80 | 0.63 | 0.27 | 0.081 |
| 2 | 0.36 | 0.77 | 0.91 | 0.93 | 0.93 | 0.87 | 0.72 | 0.38 | 0.107 |
| 3 | 0.38 | 0.77 | 0.89 | 0.92 | 0.92 | 0.87 | 0.71 | 0.37 | 0.112 |
| 4 | −0.04 | 0.54 | 0.83 | 0.91 | 0.92 | 0.89 | 0.78 | 0.47 | 0.168 |
| 5 | 0.00 | 0.59 | 0.87 | 0.93 | 0.93 | 0.88 | 0.74 | 0.43 | 0.156 |
| 6 | −0.02 | 0.60 | 0.88 | 0.93 | 0.93 | 0.88 | 0.73 | 0.41 | 0.160 |
| 7 | −0.11 | 0.41 | 0.71 | 0.78 | 0.80 | 0.73 | 0.52 | 0.22 | 0.127 |
| 8 | −0.04 | 0.52 | 0.83 | 0.91 | 0.90 | 0.82 | 0.62 | 0.29 | 0.149 |
| 9 | −0.02 | 0.55 | 0.84 | 0.90 | 0.90 | 0.82 | 0.62 | 0.29 | 0.147 |
| 10 | 0.26 | 0.75 | 0.92 | 0.95 | 0.94 | 0.90 | 0.74 | 0.38 | 0.130 |
| 11 | 0.02 | 0.63 | 0.89 | 0.94 | 0.94 | 0.89 | 0.73 | 0.40 | 0.153 |
| 12 | 0.36 | 0.77 | 0.91 | 0.93 | 0.93 | 0.87 | 0.72 | 0.38 | 0.107 |
| 13 | 0.30 | 0.75 | 0.91 | 0.94 | 0.93 | 0.88 | 0.73 | 0.38 | 0.119 |
| 14 | 0.21 | 0.71 | 0.90 | 0.93 | 0.93 | 0.88 | 0.73 | 0.39 | 0.133 |
| 15 | 0.30 | 0.74 | 0.88 | 0.91 | 0.91 | 0.86 | 0.69 | 0.34 | 0.113 |
| 16 | 0.34 | 0.76 | 0.90 | 0.93 | 0.92 | 0.87 | 0.72 | 0.37 | 0.115 |
| 17 | 0.31 | 0.76 | 0.90 | 0.93 | 0.92 | 0.88 | 0.71 | 0.35 | 0.125 |
| 18 | 0.21 | 0.72 | 0.90 | 0.94 | 0.93 | 0.88 | 0.73 | 0.38 | 0.136 |
| 19 | 0.22 | 0.71 | 0.89 | 0.93 | 0.93 | 0.88 | 0.72 | 0.37 | 0.132 |
| 20 | 0.23 | 0.73 | 0.91 | 0.94 | 0.93 | 0.88 | 0.73 | 0.38 | 0.131 |
| 21 | 0.12 | 0.67 | 0.89 | 0.93 | 0.93 | 0.88 | 0.73 | 0.39 | 0.150 |
| 22 | 0.09 | 0.65 | 0.88 | 0.92 | 0.92 | 0.87 | 0.72 | 0.38 | 0.147 |
| 23 | 0.11 | 0.67 | 0.90 | 0.94 | 0.93 | 0.88 | 0.72 | 0.39 | 0.148 |
| 24 | 0.18 | 0.71 | 0.90 | 0.94 | 0.94 | 0.90 | 0.77 | 0.42 | 0.125 |
| 25 | 0.24 | 0.73 | 0.90 | 0.94 | 0.94 | 0.90 | 0.75 | 0.41 | 0.104 |
| 26 | 0.20 | 0.69 | 0.89 | 0.92 | 0.92 | 0.86 | 0.68 | 0.33 | 0.15 |

Embodiment 3: NO$_x$ Conversion and N$_2$O Formation as a Function of the Amount of V$_2$O$_5$ The NO$_x$ conversion at 200° C. in the fresh and the aged state as a function of the amount of V$_2$O$_5$ in wt.-% in catalyst compositions comprising 3.6 wt.-% WO$_3$ and 1.6 wt.-% Sb$_2$O$_5$ is shown in FIG. 1. For comparison a catalyst comprising 2.7 wt.-% V$_2$O$_5$, 4.0 wt.-% WO$_3$ and 0 wt.-% Sb$_2$O$_5$ is also shown. All amounts given for the respective oxides refer to the total amount of the catalyst composition. The balance to 100 wt.-% is represented by TiO$_2$.

The aging of the catalyst composition and the measurement of the NOx conversion were carried out as described above.

Table 4 lists the catalyst compositions and the Nox conversions.

The results are shown in FIG. 1.

TABLE 4

NO$_x$ conversion at 200° C. in the fresh and the aged state as a function of the amount of V$_2$O$_5$ in wt.-% in catalyst compositions comprising 3.6 wt.-% WO$_3$ and 1.6 wt.-% Sb$_2$O$_5$ compared to a catalyst comprising 2.7 wt.-% V$_2$O$_5$, 4.0 wt.-% WO$_3$ and 0 wt.-% Sb$_2$O$_5$.

| Example | V$_2$O$_5$ (wt.-%) | WO$_3$ (wt.-%) | Sb$_2$O$_5$ (wt.-%) | NO$_x$ (fresh) | NO$_x$ (aged) |
|---|---|---|---|---|---|
| 2 | 2.5 | (3.5) | 1.6 | 0.39 | 0.38 |
| 5 | 3.4 | 3.6 | 1.6 | 0.55 | 0.43 |
| 8 | 2.7 | 4.0 | 0.0 | 0.35 | 0.29 |
| 11 | (3.0) | 3.6 | 1.6 | 0.48 | 0.40 |
| 12 | 2.5 | (3.5) | 1.6 | 0.40 | 0.38 |
| 14 | 2.7 | 3.6 | 1.6 | 0.45 | 0.39 |

Figure 2:
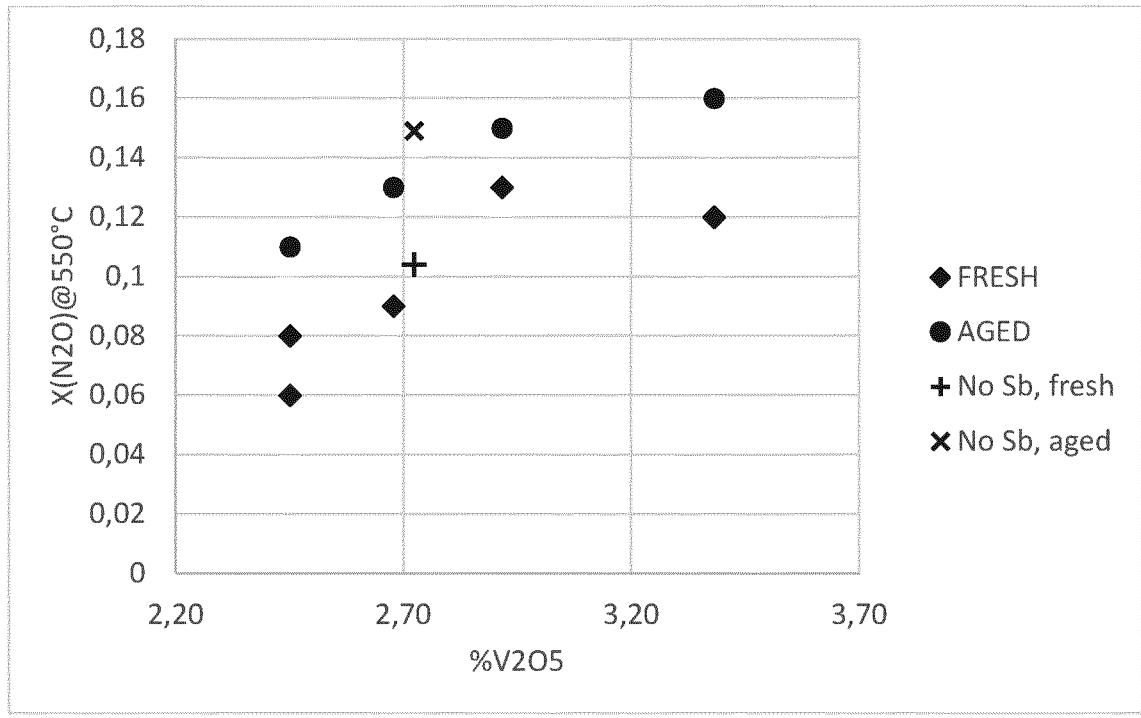
FIG. 2 shows the $N_2O$ formation at 550° C. in the fresh and the aged state as a function of the amount of $V_2O_5$ in wt.-% in catalyst compositions comprising 3.6 wt.-% $WO_3$ and 1.6 wt.-% $Sb_2O_5$ compared to a catalyst comprising 2.7 wt.-% $V_2O_5$, 4.0 wt.-% $WO_3$ and 0 wt.-% $Sb_2O_5$.

The N$_2$O formation at 550° C. in the fresh and the aged state as a function of the amount of V$_2$O$_5$ in wt.-% in catalyst compositions comprising 3.6 wt.-% WO$_3$ and 1.6 wt.-% Sb$_2$O$_5$ is shown in FIG. 2. For comparison a catalyst comprising 2.7 wt.-% V$_2$O$_5$, 4.0 wt.-% WO$_3$ and 0 wt.-% Sb$_2$O$_5$ is also shown. All amounts given for the respective oxides refer to the total amount of the catalyst composition. The balance to 100 wt.-% is represented by TiO$_2$.

The aging of the catalyst composition and the measurement of the N$_2$O formation were carried out as described above.

Table 5 lists the catalyst compositions and the N$_2$O formation.

The results are shown in FIG. 2.

TABLE 5

N$_2$O formation at 550° C. in the fresh and the aged state as a function of the amount of V$_2$O$_5$ in wt.-% in catalyst compositions comprising 3.6 wt.-% WO$_3$ and 1.6 wt.-% Sb$_2$O$_5$ compared to a catalyst comprising 2.7 wt.-% V$_2$O$_5$, 4.0 wt.-% WO$_3$ and 0 wt.-% Sb$_2$O$_5$.

| Example | V$_2$O$_5$ (wt.-%) | WO$_3$ (wt.-%) | Sb$_2$O$_5$ (wt.-%) | N$_2$O (fresh) | N$_2$O (aged) |
|---|---|---|---|---|---|
| 2 | 2.5 | (3.5) | 1.6 | 0.06 | 0.11 |
| 5 | 3.4 | 3.6 | 1.6 | 0.12 | 0.16 |
| 8 | 2.7 | 4.0 | 0.0 | 0.104 | 0.149 |
| 11 | (3.0) | 3.6 | 1.6 | 0.13 | 0.15 |
| 12 | 2.5 | (3.5) | 1.6 | 0.08 | 0.11 |
| 14 | 2.7 | 3.6 | 1.6 | 0.09 | 0.13 |

Embodiment 3: NO$_x$ Conversion and N$_2$O Formation as a Function of the Amount of WO$_3$ The NO$_x$ conversion at 200° C. in the fresh and the aged state as a function of the amount of WO$_3$ in wt.-% in catalyst compositions comprising 2.4 wt.-% V$_2$O$_5$ and 1.6 wt.-% Sb$_2$O$_5$ Is shown in FIG. 1. For comparison, catalysts comprising 2.7 wt-% V$_2$O$_5$, 0 wt.-% Sb$_2$O$_5$ and variable amounts of WO$_3$ are also shown. All amounts given for the respective oxides refer to the total amount of the catalyst composition. The balance to 100 wt.-% is represented by TiO$_2$.

The aging of the catalyst composition and the measurement of the NOx conversion were carried out as described above.

Table 6 lists the catalyst compositions and the NOx conversions.

Figure 3:
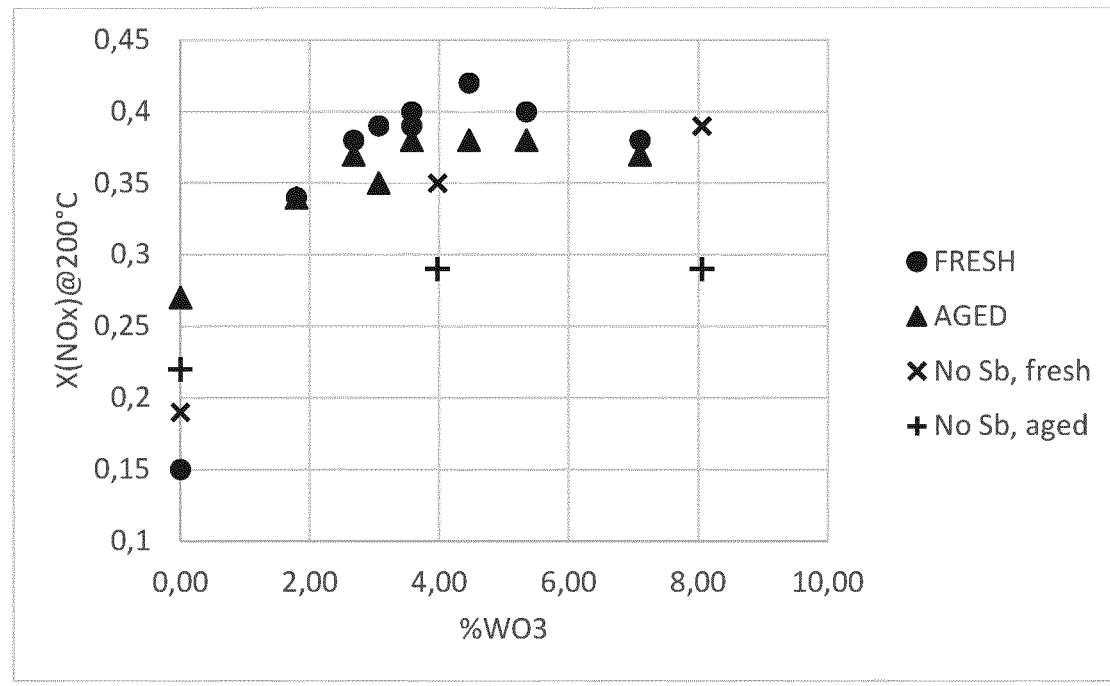
FIG. 3 shows the $NO_x$ conversion at 200° C. in the fresh and the aged state as a function of the amount of $WO_3$ in wt.-% in catalyst compositions comprising 2.4 wt.-% $V_2O_5$ and 1.6 wt.-% $Sb_2O_5$ compared to catalysts comprising 2.7 wt.-% $V_2O_5$, 0 wt.-% $Sb_2O_5$.

The results are shown in FIG. 3.

TABLE 6

NO$_x$ conversion at 200° C. in the fresh and the aged state as a function of the amount of WO$_3$ in wt.-% in catalyst compositions comprising 2.4 wt.-% V$_2$O$_5$ and 1.6 wt.-% Sb$_2$O$_5$ compared to catalysts comprising 2.7 wt.-% V$_2$O$_5$, 1.6 wt.-% or 0 wt.-% Sb$_2$O$_5$ and variable amounts of WO$_3$

| Example | V$_2$O$_5$ (wt.-%) | WO$_3$ (wt.-%) | Sb$_2$O$_5$ (wt.-%) | NO$_x$ (fresh) | NO$_x$ (aged) |
|---|---|---|---|---|---|
| 1 | 2.5 | 0.0 | 1.6 | 0.15 | 0.27 |
| 2 | 2.5 | 3.5 | 1.6 | 0.39 | 0.38 |
| 3 | 2.4 | 7.2 | 1.6 | 0.38 | 0.37 |
| 7 | 2.7 | 0.0 | 0.0 | 0.19 | 0.22 |
| 8 | 2.7 | 4.0 | 0.0 | 0.35 | 0.29 |
| 9 | 2.7 | 8.1 | 0.0 | 0.39 | 0.29 |
| 10 | 2.5 | 5.3 | 1.6 | 0.4 | 0.38 |
| 12 | 2.5 | 3.6 | 1.6 | 0.4 | 0.38 |
| 13 | 2.5 | 4.4 | 1.6 | 0.42 | 0.38 |
| 15 | 2.5 | 1.8 | 1.6 | 0.34 | 0.34 |
| 16 | 2.5 | 2.7 | 1.6 | 0.38 | 0.37 |
| 17 | 2.5 | 3.1 | 1.6 | 0.39 | 0.35 |

Figure 4:
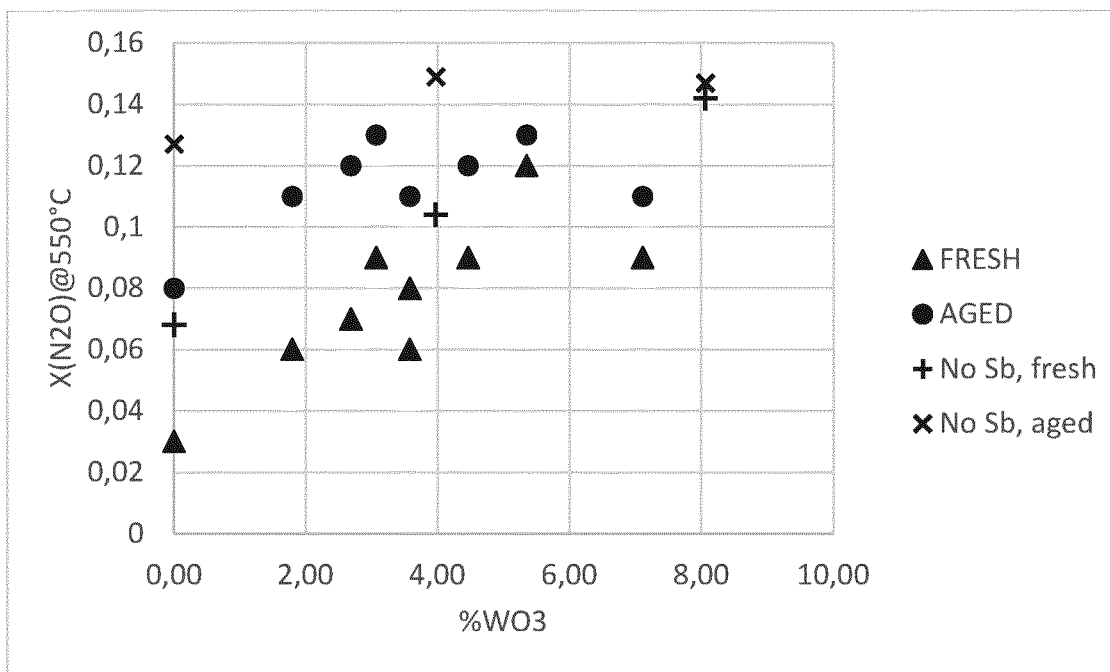
FIG. 4 shows the $N_2O$ formation at 550° C. in the fresh and the aged state as a function of the amount of $WO_3$ in wt.-% in catalyst compositions comprising 2.4 wt.-% $V_2O_5$ and 1.6 wt.-% $Sb_2O_5$ compared to catalysts comprising 2.7 wt.-% $V_2O_5$, and 0 wt.-% $Sb_2O_5$.

The N$_2$O formation at 550° C. in the fresh and the aged state as a function of the amount of WO$_3$ in wt-% in catalyst compositions comprising 2.4 wt.-% $V_2O_5$ and 1.6 wt.-% $Sb_2O_5$ Is shown in FIG. 4. For comparison, catalysts comprising 2.7 wt.-% $V_2O_5$, 0 wt.-% $Sb_2O_5$ and variable amounts of $WO_3$ are also shown. All amounts given for the respective oxides refer to the total amount of the catalyst composition. The balance to 100 wt.-% is represented by $TiO_2$.

The aging of the catalyst composition and the measurement of the $N_2O$ formation were carried out as described above.

Table 7 lists the catalyst compositions and the $N_2O$ formations.

The results are shown in FIG. 4.

TABLE 7

$N_2O$ formation at 550° C. in the fresh and the aged state as a function of the amount of $WO_3$ in wt.-% in catalyst compositions comprising 2.4 wt.-% $V_2O_5$ and 1.6 wt.-% $Sb_2O_5$ compared to a catalyst comprising 2.7 wt.-% $V_2O_5$, and 1.6 wt.-% or 0 wt.-% $Sb_2O_5$ and variable amounts of $WO_3$

| Example | $V_2O_5$ (wt.-%) | $WO_3$ (wt.-%) | $Sb_2O_5$ (wt.-%) | $N_2O$ (fresh) | $N_2O$ (aged) |
|---|---|---|---|---|---|
| 1 | 2.5 | 0.0 | 1.6 | 0.03 | 0.08 |
| 2 | 2.5 | 3.5 | 1.6 | 0.06 | 0.11 |
| 3 | 2.4 | 7.2 | 1.6 | 0.09 | 0.11 |
| 7 | 2.7 | 0.0 | 0.0 | 0.068 | 0.13 |
| 8 | 2.7 | 4.0 | 0.0 | 0.104 | 0.15 |
| 9 | 2.7 | 8.1 | 0.0 | 0.142 | 0.15 |
| 10 | 2.5 | 5.3 | 1.6 | 0.12 | 0.13 |
| 12 | 2.5 | 3.5 | 1.6 | 0.08 | 0.11 |
| 13 | 2.5 | 4.4 | 1.6 | 0.09 | 0.12 |
| 15 | 2.5 | 1.8 | 1.6 | 0.06 | 0.11 |
| 16 | 2.5 | 2.7 | 1.6 | 0.07 | 0.12 |
| 17 | 2.5 | 3.1 | 1.6 | 0.09 | 0.13 |

Embodiment 4: $NO_x$ Conversion and $N_2O$ Formation as a Function of the Amount of $Sb_2O_5$ Examples 2 and 26, containing antimony, show a higher stability and higher fresh performance than examples 8 and 9, not containing antimony.

Example 9 demonstrates that fresh performance can be compensated for by increasing the tungsten content in formulations not containing antimony. However, the thermal stability cannot be achieved without adding antimony.

Figure 5:
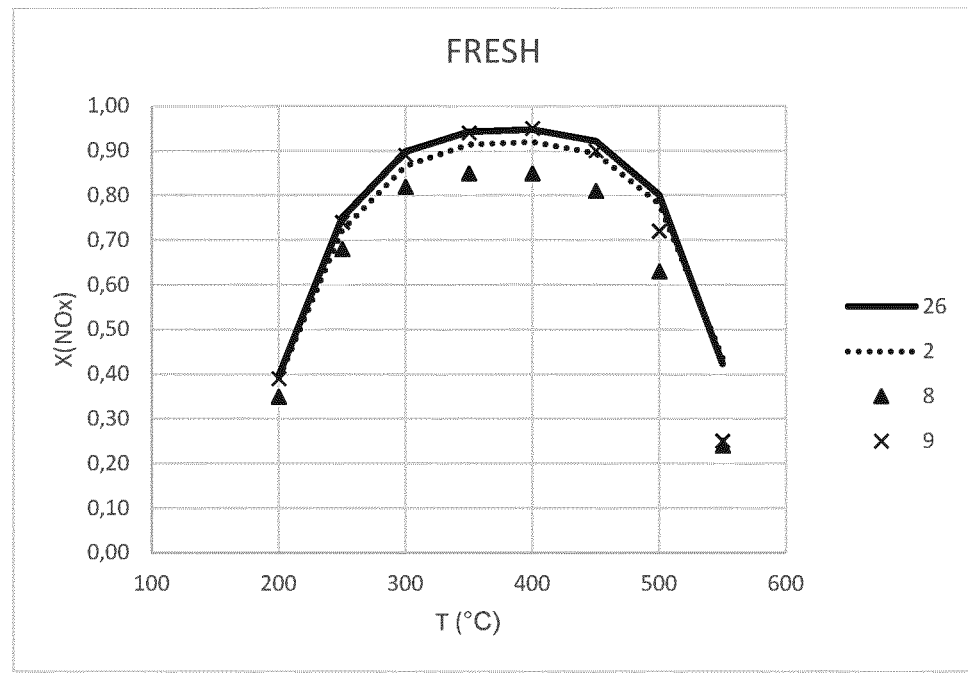
FIG. 5 shows the $NO_x$ conversion as a function of the amount of $Sb_2O_5$ for fresh catalyst compositions.

Table 8 shows the $NO_x$ conversion and $N_2O$ formation as a function of the amount of $Sb_2O_5$ for the fresh catalyst compositions. The results for the $NO_x$ conversion are shown in FIG. 5.

Figure 6:
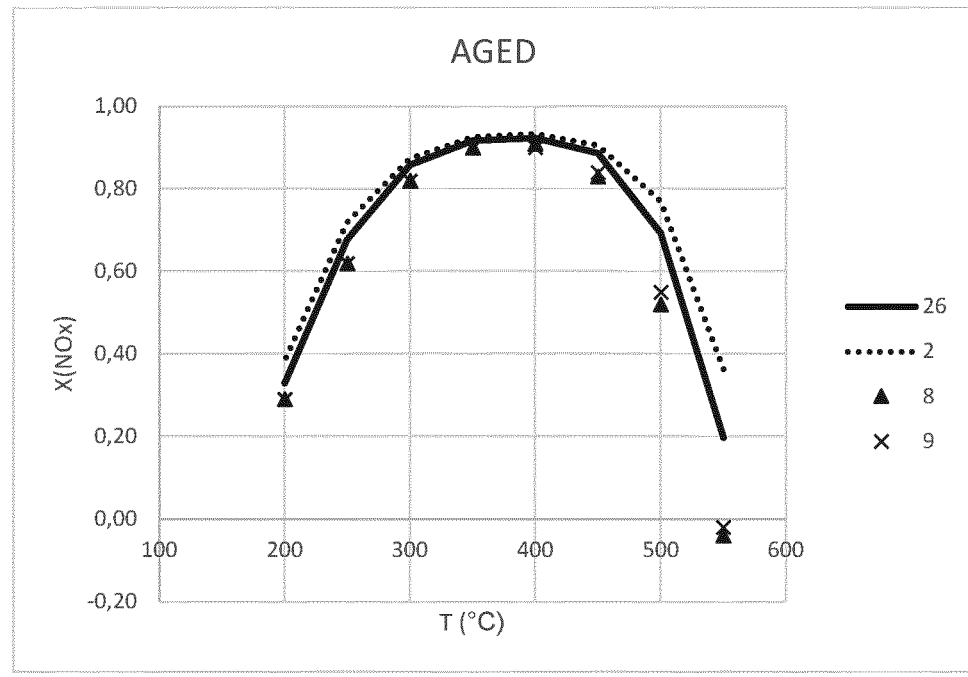
FIG. 6 shows the $NO_x$ conversion as a function of the amount of $Sb_2O_5$ for aged catalyst compositions.

Table 9 shows the $NO_x$ conversion and $N_2O$ formation as a function of the amount of $Sb_2O_5$ for the aged catalyst compositions. The results for the $NO_x$ conversion are shown in FIG. 6.

TABLE 8

$NO_x$ conversion and $N_2O$ formation as a function of the amount of $Sb_2O_5$ for fresh catalyst compositions 2, 8, 9 and 26

| Ex. No. | X (550) | X (500) | X (450) | X (400) | X (350) | X (300) | X (250) | X (200) | N2O (550) |
|---|---|---|---|---|---|---|---|---|---|
| 2 | 0.44 | 0.78 | 0.89 | 0.92 | 0.91 | 0.87 | 0.72 | 0.39 | 0.06 |
| 26 | 0.42 | 0.80 | 0.92 | 0.95 | 0.94 | 0.90 | 0.75 | 0.40 | 0.10 |
| 8 | 0.24 | 0.63 | 0.81 | 0.85 | 0.85 | 0.82 | 0.68 | 0.35 | 0.104 |
| 9 | 0.25 | 0.72 | 0.9 | 0.95 | 0.94 | 0.89 | 0.74 | 0.39 | 0.142 |

TABLE 9

$NO_x$ conversion and $N_2O$ formation as a function of the amount of $Sb_2O_5$ for aged catalyst compositions 2, 8, 9 and 26

| Ex. No. | X (550) | X (500) | X (450) | X (400) | X (350) | X (300) | X (250) | X (200) | $N_2O$ (550) |
|---|---|---|---|---|---|---|---|---|---|
| 2 | 0.36 | 0.77 | 0.91 | 0.93 | 0.93 | 0.87 | 0.72 | 0.38 | 0.11 |
| 26 | 0.20 | 0.69 | 0.89 | 0.92 | 0.92 | 0.86 | 0.68 | 0.33 | 0.15 |
| 8 | −0.04 | 0.52 | 0.83 | 0.91 | 0.9 | 0.82 | 0.62 | 0.29 | 0.149 |
| 9 | −0.02 | 0.55 | 0.84 | 0.9 | 0.9 | 0.82 | 0.62 | 0.29 | 0.147 |

The embodiments above show that the addition of antimony improves the thermal stability of the catalyst compositions. If antimony is present in the catalyst composition, lower amounts of vanadium and tungsten, respectively, are required to obtain a denitrification activity in range of a catalyst comprising only vanadium and tungsten, but no antimony.

In contradiction to the prior art, is has been shown that $WO_3$ is necessary to achieve a good fresh performance of the catalyst composition, as can be seen from FIG. 2.

Embodiment 5: $NO_x$ Conversion and $N_2O$ Formation of a Sample Containing 0% $ZrO_2$ A water-based slurry containing $TiO_2$ (anatase) having a dry matter content of 55% was applied on a corrugated substrate with a cpsi of 260. The zirconium free substrate was then calcined at 580° C. Subsequently, impregnation solutions were prepared by mixing 215 grams of a water-based solution containing vanadyl oxalate (7.15% V), 72 grams of an aqueous solution of ammonium metatungstate (39.36% W), 151 grams of deionized water, 59 grams of tartaric acid and 28 grams of antimony acetate. The substrate was then dipped into the impregnation solution for 20 seconds, dried and then thermally treated at 450° C. resulting in a catalytic load of % $V_2O_5$, % $WO_3$, % $Sb_2O_5$, based on the total weight of the catalyst composition, of 3.1, 4.0 and 1.7%, respectively. The sample labelled 27 was measured at:

NOx (250 ppm), $NH_3$ (300 ppm), $H_2O$ (4%), $O_2$ (12%), GSVH=100000 $h^{-1}$, $N_2$ to balance. The NOx conversion was measured at 200, 250, 300, 350, 400, 450, 500 and 550° C.

Aging was performed at 100 h at 550° C., $H_2O$=(10%), GSVH=10000 $h^{-1}$.

Figure 7:
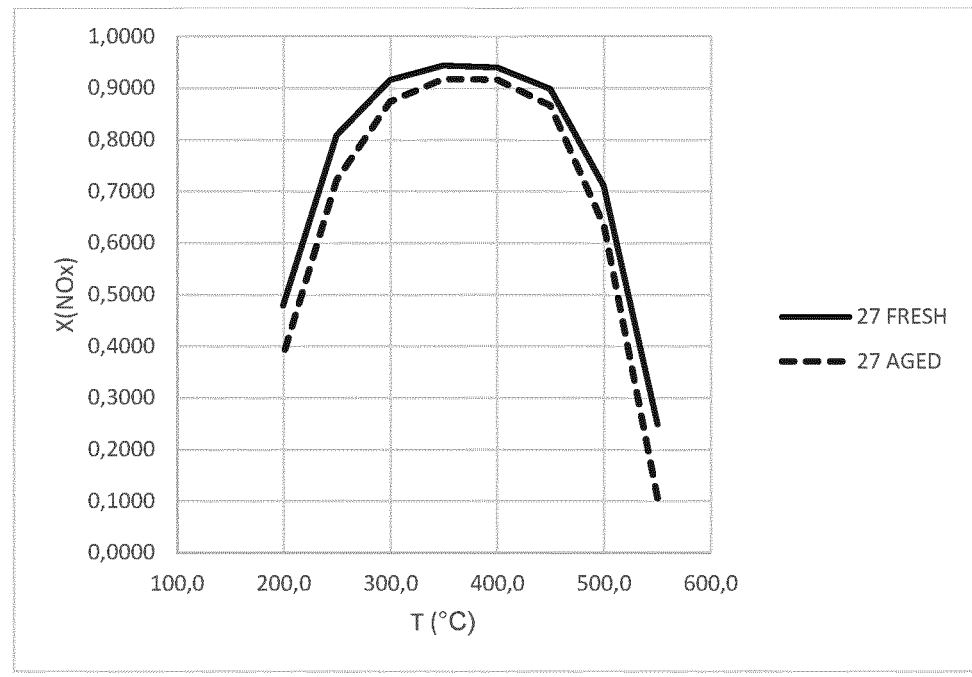
FIG. 7 shows the NOx conversion and the $N_2O$ formation at 550° C. for a sample containing 0 wt.-% $ZrO_2$.

The results are shown in FIG. 7 and Tab. 10.

TABLE 10

$NO_x$ conversion and $N_2O$ formation for fresh and aged catalyst 27

| | X (550) | X (500) | X (450) | X (400) | X (350) | X (300) | X (250) | X (200) | N2O (550) |
|---|---|---|---|---|---|---|---|---|---|
| 27 FRESH | 0.25 | 0.71 | 0.90 | 0.94 | 0.94 | 0.92 | 0.81 | 0.48 | 0.11 |
| 27 AGED | 0.11 | 0.63 | 0.87 | 0.92 | 0.92 | 0.87 | 0.72 | 0.38 | 0.13 |

Embodiment 6: NOx Conversion and $N_2O$ Formation of a Sample Made with the One-Pot Method A water-based slurry containing $TiO_2$ (anatase), $VO_2$, $Sb_2$(glycolate)$_3$, $WO_3$ and having a dry matter content of 55% was applied a corrugated substrate with a cpsi of 260 and then calcined at 580° C. resulting in a catalytic load of % V$_2$O$_5$, % WO$_3$, % Sb$_2$O$_5$, based on the total weight of the catalyst composition, of 3.2, 4.0, and 2.0%, respectively. The sample labelled 28 was measured at:

NOx (250 ppm), NH$_3$ (300 ppm), H$_2$O (4%), O$_2$ (12%), GSVH=100000 h$^{-1}$, N$_2$ to balance. The NOx conversion was measured at 200, 250, 300, 350, 400, 450, 500 and 550° C.

Aging was performed at 100 h at 550° C., H$_2$O=(10%), GSVH=10000 h$^{-1}$.

Figure 8:
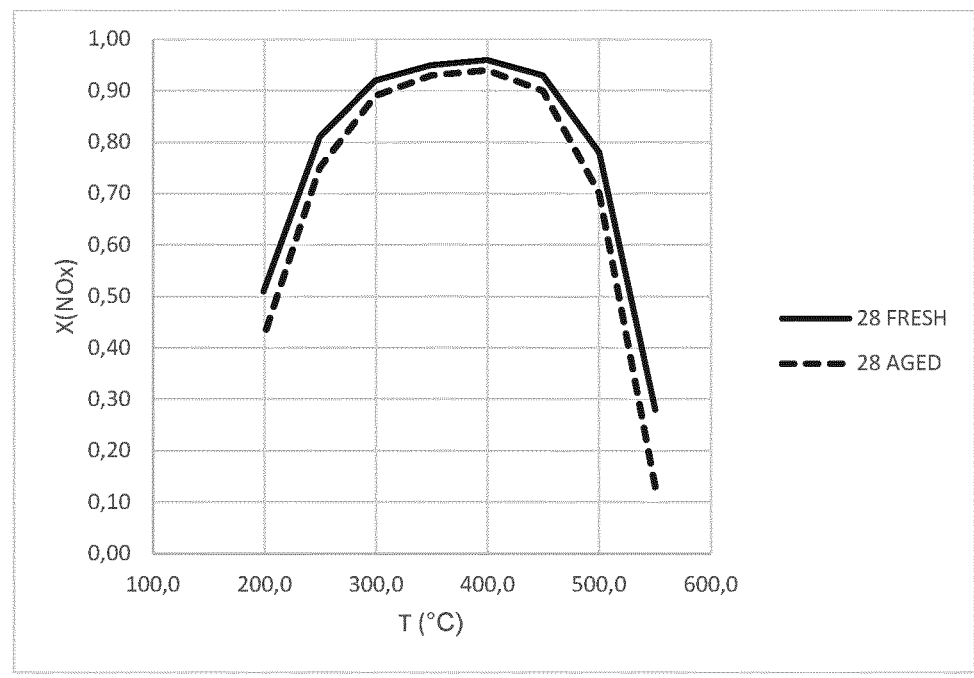
FIG. 8 shows the $NO_x$ conversion and the $N_2O$ formation at 550° C. for a sample made with the one-pot method.

The results are shown in FIG. 8 and Tab. 11.

TABLE 11

NO$_x$ conversion and N$_2$O formation for fresh and aged catalyst 28

|  | X (550) | X (500) | X (450) | X (400) | X (350) | X (300) | X (250) | X (200) | N2O (550) |
|---|---|---|---|---|---|---|---|---|---|
| 28 FRESH | 0.28 | 0.78 | 0.93 | 0.96 | 0.95 | 0.92 | 0.81 | 0.51 | 0.12 |
| 28 AGED | 0.13 | 0.70 | 0.90 | 0.94 | 0.93 | 0.89 | 0.75 | 0.42 | 0.16 |

Embodiment 7: Sample Made with the One-Pot Method on a Cordierite Substrate

A water-based slurry containing TiO$_2$ (anatase), VO$_2$, WO$_3$, Sb$_2$O$_5$ and having a dry matter content of 55% was applied on a cordierite substrate with a cpsi of 300 and then calcined at 580° C. resulting in a catalytic load of % V$_2$O$_5$, % WO$_3$, % Sb$_2$O$_5$, based on the total weight of the catalyst composition, of 3.2, 4.0, and 2.0%, respectively.

The sample labelled 29 was measured at:

NOx (250 ppm), NH$_3$ (300 ppm), H$_2$O (4%), O$_2$ (12%), GSVH=100000 h$^{-1}$, N$_2$ to balance. The NOx conversion was measured at 200, 250, 300, 350, 400, 450, 500 and 550° C.

Aging was performed at 100 h at 550° C., H$_2$O=(10%), GSVH=10000 h$^{-1}$.

The NOx conversion and the N$_2$O formation are comparable to that of Embodiment 6.

The invention claimed is:

1. A catalyst composition for the selective catalytic reduction of nitrogen oxides, consisting of
    at least one oxide of vanadium in an amount of 2.0 to 4.0 wt.-%, calculated as V$_2$O$_5$ and based on the total weight of the catalyst composition,
    at least one oxide of tungsten in an amount of 2.5 to 7.2 wt.-%, calculated as WO$_3$ and based on the total weight of the catalyst composition,
    at least one oxide of antimony in an amount of 0.6 to 3.4 wt.-%, calculated as Sb$_2$O$_5$ and based on the total weight of the catalyst composition,
    at least one oxide of zirconium in an amount of 0.2 to 1.0 wt.-%, calculated as ZrO$_2$ and based on the total weight of the catalyst composition, and
    at least one oxide of titanium in an amount of 84.6 to 94.7 wt.-% calculated as TiO$_2$ and based on the total weight of the catalyst composition,
    wherein the weight percents of the oxides of vanadium, tungsten, antimony, titanium, and zirconium, calculated as V$_2$O$_5$, WO$_3$, Sb$_2$O$_5$, TiO$_2$, and ZrO$_2$, respectively, add up to 100 wt.-%.

2. The catalyst composition according to claim 1, wherein at least 95 wt.-% of the at least one oxide of titanium is provided in the form of anatase.

3. An SCR catalytic article comprising a catalyst substrate onto which the SCR catalyst composition according to claim 1 is affixed in the form of a coating.

4. The SCR catalytic article according to claim 3, wherein the catalyst substrate is selected from corrugated substrates and cordierite monoliths.

5. The SCR catalytic article according to claim 4, wherein the catalyst substrate is a cordierite monolith selected from wall-flow filters and flow-through substrates.

6. A method for the reduction of nitrogen oxides in exhaust gases of lean-burn internal combustion engines, comprising
    adding a reducing agent to the exhaust-gas containing nitrogen oxides, and
    passing the resulting mixture of exhaust-gas containing nitrogen oxides and reducing agent over the catalytic article according to claim 5.

7. An exhaust gas purification system for the treatment of diesel exhaust gas, comprising
    an oxidation catalyst,
    a diesel particle filter, and
    the catalytic article according to claim 3.

8. An exhaust gas purification system for the treatment of diesel exhaust gas, comprising
    an oxidation catalyst, and
    a diesel particle filter on which the catalyst composition according to claim 1 is present as a coating.

* * * * *